(12) United States Patent
Meyer et al.

(10) Patent No.: US 10,393,259 B2
(45) Date of Patent: Aug. 27, 2019

(54) HYBRID VEHICLE CONTROL USING ADAPTIVE TRANSMISSION TORQUE CONVERTER CLUTCH CAPACITY ESTIMATION

(71) Applicant: Ford Global Technologies, LLC, Dearborn, MI (US)

(72) Inventors: Jason Meyer, Canton, MI (US); Jeffrey Allen Doering, Canton, MI (US); Bernard D. Nefcy, Novi, MI (US); Rajit Johri, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 74 days.

(21) Appl. No.: 15/871,353

(22) Filed: Jan. 15, 2018

(65) Prior Publication Data

US 2019/0219163 A1 Jul. 18, 2019

(51) Int. Cl.
*B60K 6/387* (2007.10)
*F16H 61/14* (2006.01)
*B60K 6/547* (2007.10)
*F16D 48/02* (2006.01)
*F16D 48/06* (2006.01)

(52) U.S. Cl.
CPC .......... *F16H 61/143* (2013.01); *B60K 6/387* (2013.01); *B60K 6/547* (2013.01); *F16D 48/02* (2013.01); *F16D 48/066* (2013.01); *B60Y 2200/92* (2013.01); *B60Y 2300/421* (2013.01); *B60Y 2400/426* (2013.01); *F16D 2500/10412* (2013.01); *F16D 2500/30415* (2013.01); *F16D 2500/70217* (2013.01); *Y10S 903/914* (2013.01); *Y10S 903/946* (2013.01)

(58) Field of Classification Search
None
See application file for complete search history.

(56) References Cited

U.S. PATENT DOCUMENTS

| | | | |
|---|---|---|---|
| 6,173,226 B1 | 1/2001 | Yoshida et al. | |
| 7,317,978 B2 | 1/2008 | Ashizawa et al. | |
| 8,116,957 B2 | 2/2012 | Oh et al. | |
| 8,326,475 B2 | 12/2012 | Yoshida et al. | |
| 9,096,214 B2 | 8/2015 | Terakawa et al. | |
| 10,214,203 B2 * | 2/2019 | Johri | B60K 6/387 |
| 2014/0330469 A1 | 11/2014 | Yoshida et al. | |

* cited by examiner

*Primary Examiner* — Dirk Wright
(74) *Attorney, Agent, or Firm* — David Kelley; Brooks Kushman P.C.

(57) ABSTRACT

A hybrid vehicle includes an engine, an electric machine selectively coupled to the engine, a transmission having a torque converter impeller coupled to the electric machine and a torque converter clutch configured to selectively couple the impeller to a turbine, and a controller configured to control pressure of the torque converter clutch responsive to estimated clutch capacity, which is adjusted by the controller to equal impeller torque responsive to impeller speed exceeding turbine speed during clutch disengagement. A model of estimated torque converter clutch capacity may be stored in memory and adapted to actual clutch capacity by applying a gain or offset determined during opening of the clutch.

20 Claims, 3 Drawing Sheets

HYBRID VEHICLE CONTROL USING ADAPTIVE TRANSMISSION TORQUE CONVERTER CLUTCH CAPACITY ESTIMATION

TECHNICAL FIELD

This disclosure generally relates to control of a hybrid vehicle having an automatic transmission with a torque converter and associated torque converter clutch based on an estimated torque converter clutch capacity.

BACKGROUND

Hybrid vehicles may include an automatic transmission having a torque converter and associated torque converter clutch. The amount of torque transmission ability of the torque converter clutch may be referred to as the torque converter clutch capacity and may be controlled while the clutch is slipping by adjusting the hydraulic pressure applied to the torque converter clutch. Accurate determination of the torque converter clutch capacity facilitates control of torque delivery to the vehicle wheels for desired drivability under varying vehicle and ambient operating conditions. One strategy for determining the torque converter clutch capacity uses a static torque converter clutch model that predicts the transfer function between clutch pressure and torque capacity. While this strategy is acceptable for the majority of operating conditions in many applications, vehicle drivability may be less than optimal under some conditions.

SUMMARY

Embodiments according to the disclosure may include a vehicle having an engine, an electric machine selectively coupled to the engine, a transmission having a torque converter impeller coupled to the electric machine and a torque converter clutch selectively coupling the impeller to a turbine, and a controller configured to control pressure of the torque converter clutch responsive to estimated clutch capacity, which is adjusted by the controller to equal impeller torque responsive to impeller speed exceeding turbine speed during clutch disengagement.

In at least one embodiment, a hybrid vehicle having an electric machine coupled to an engine and a torque converter impeller of an automatic transmission having a bypass clutch configured to couple the impeller to a turbine includes a controller configured to control pressure of the bypass clutch responsive to estimated clutch capacity adjusted to impeller torque responsive to a speed differential between an impeller speed and a turbine speed during opening of the bypass clutch. The controller may be configured to adjust the estimated clutch capacity by applying a gain to an estimated clutch capacity retrieved from a memory coupled to the controller based on a model of torque converter clutch capacity. The model may be stored as a lookup table in the non-transitory memory. The controller may be configured to adjust the estimated clutch capacity by applying an offset to an estimated clutch capacity retrieved from a memory coupled to the controller. The vehicle may include a memory readable by the controller and having stored data representing a torque converter clutch capacity model to provide the estimated clutch capacity.

Embodiments may also include a method for controlling a vehicle having an electric machine coupled to an engine and an automatic transmission including a torque converter impeller, turbine, and a clutch configured to couple the impeller to the turbine, comprising, by a controller, controlling pressure of the torque converter clutch responsive to an estimated clutch capacity adjusted by a gain or offset to an impeller torque when impeller speed differs from turbine speed while releasing the torque converter clutch. The method may include storing the gain or offset used to adjust the estimated clutch capacity to the impeller torque in a memory accessible by the controller, wherein the estimated clutch capacity is adjusted by a previously stored gain or offset retrieved from the memory. The method may also include retrieving the estimated clutch capacity from a torque converter clutch capacity model stored in a memory accessible by the controller. The method may include a torque converter clutch capacity model stored in a lookup table in the memory.

Embodiments according to the disclosure may provide one or more advantages. For example, adaptive correction of torque converter clutch estimation may improve drivability by providing improved control of clutch pressure during controlled slip operation. More accurate estimation of torque converter clutch capacity may also be used to place the motor into speed control during operating conditions where coordinating torque of the engine and motor is difficult. Similarly, more accurate estimation of torque converter clutch capacity may be used to provide inertial torque compensation to reduce or eliminate torque holes associated with opening of the torque converter clutch.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
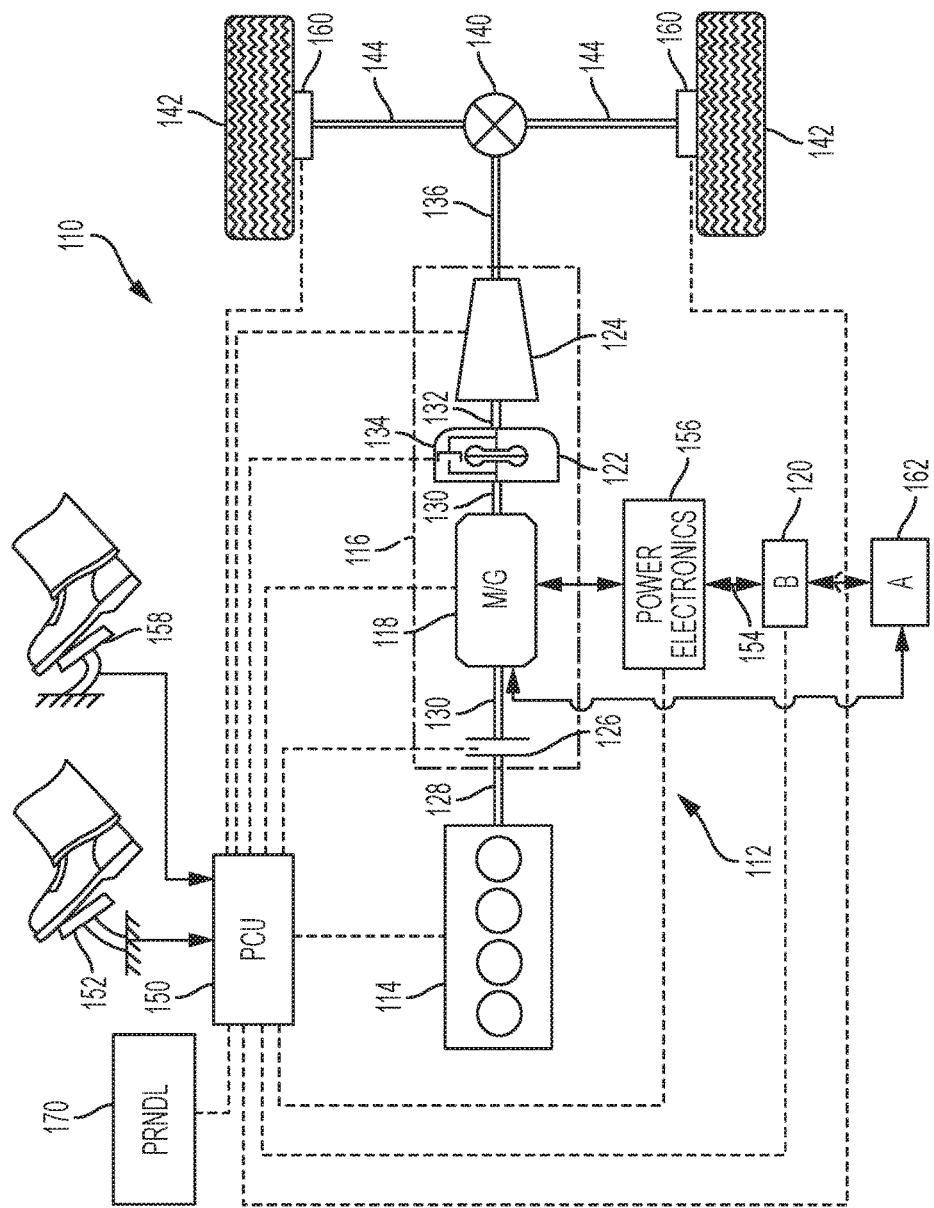
FIG. 1 is a block diagram illustrating a representative hybrid vehicle with an adaptive torque converter clutch capacity estimation according to one or more embodiments.

Referring to FIG. 1, a schematic diagram of a hybrid electric vehicle (HEV) 110 is illustrated having a control system that controls HEV 110 based on an adaptive or adjusted torque converter clutch capacity according to one or more embodiments of the present disclosure. FIG. 1 illustrates representative arrangement of the components. Physical placement and orientation of the components within the vehicle may vary. The HEV 110 includes a powertrain 112. The powertrain 112 includes an engine 114 that drives a transmission 116, which may be referred to as a modular hybrid transmission (MHT). As will be described in further detail below, transmission 116 may include an electric machine such as an electric motor/generator (M/G) 118, an associated traction battery 120, a torque converter 122, and a multiple step-ratio automatic transmission, or gearbox 124.

The engine 114 and the M/G 118 are both drive sources for the HEV 110. The engine 114 generally represents a power source that may include an internal combustion engine such as a gasoline, diesel, or natural gas powered engine. The engine 114 generates an engine power and corresponding engine torque that is supplied to the M/G 18 when a disconnect clutch 126 between the engine 114 and the M/G 118 is at least partially engaged. The engine 114 may be operated in a closed-loop speed control mode or torque control mode. The M/G 118 may be implemented by any one of a plurality of types of electric machines. For example, M/G 118 may be a permanent magnet synchronous motor. The M/G 118 may be operated in a closed-loop speed control mode or torque control mode. Power electronics 156 condition direct current (DC) power provided by the battery 120 to the requirements of the M/G 118, as will be described below. For example, power electronics may provide three-phase alternating current (AC) to the M/G 118.

When the disconnect clutch 126 is at least partially engaged, power flow from the engine 114 to the M/G 118 or from the M/G 118 to the engine 114 is possible. For example, the disconnect clutch 126 may be engaged and M/G 118 may operate as a generator to convert rotational energy provided by a crankshaft 128 and M/G shaft 130 into electrical energy to be stored in the battery 120, which may be a high-voltage traction battery. The disconnect clutch 126 can also be disengaged to isolate the engine 114 from the remainder of the powertrain 112 such that the M/G 118 can act as the sole drive source for the HEV 110. In the representative embodiment illustrated, shaft 130 extends through the M/G 118. The M/G 118 is continuously drivably connected to the shaft 130, whereas the engine 114 is drivably connected to the shaft 130 only when the disconnect clutch 126 is at least partially engaged.

The M/G 118 is connected to the torque converter 122 via shaft 130. The torque converter 122 is therefore connected to the engine 114 when the disconnect clutch 126 is at least partially engaged. The torque converter 122 includes an impeller fixed to M/G shaft 130 and a turbine fixed to a transmission input shaft 132. The torque converter 122 thus provides a hydraulic coupling between shaft 130 and transmission input shaft 132. The torque converter 122 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch (also known as a torque converter lock-up clutch or torque converter clutch) 134 may also be provided that, when engaged, frictionally or mechanically couples the impeller and the turbine of the torque converter 122, permitting more efficient power transfer. The torque converter bypass clutch 134 may be operated as a launch clutch to provide smooth vehicle launch. Alternatively, or in combination, a launch clutch similar to disconnect clutch 126 may be provided between the M/G 118 and gearbox 124 for applications that do not include a torque converter 122 or a torque converter bypass clutch 134. In some applications, disconnect clutch 126 is generally referred to as an upstream clutch and launch clutch 134 (which may be a torque converter bypass clutch) is generally referred to as a downstream clutch.

The torque transfer capacity of torque converter clutch 134 may be controlled during slipping of the torque converter clutch 134 by controller 150, which controls hydraulic pressure supplied to the clutch. Slipping of the torque converter clutch 134 is detected or determined by a differential speed between the clutch input or impeller speed associated with shaft 130, and the clutch output or turbine speed associated with transmission turbine shaft or input shaft 132, which may be measured directly by associated sensors or calculated based on upstream or downstream sensor signals. When fully engaged, torque capacity of torque converter clutch 134 is determined by the applied hydraulic pressure and the characteristics of the clutch, including the temperature, surface area, friction material, etc. as generally understood by those of ordinary skill in the art. When fully open, the torque capacity of torque converter clutch 134 is substantially zero. As described in greater detail with reference to FIGS. 2A-2D and FIG. 3, the torque converter clutch capacity estimate or determination may be adjusted or adapted to reduce or eliminate any difference or error between the estimated and actual capacity when the clutch first starts slipping by setting the estimated torque capacity to the impeller torque.

The gearbox 124 may include gear sets (not shown) that are selectively placed in different forward and reverse gear ratios by selective engagement of friction elements such as clutches and brakes (not shown) to establish the desired multiple discrete or step drive ratios. The gearbox 124 also includes a park position that engages a pawl with a corresponding gear to mechanically lock the transmission. A gear selector 170 may be used to select park (P) or neutral (N), or a corresponding gear or gear range, such as reverse (R), drive (D), low (L), manual (M), etc. The friction elements are controllable through a shift schedule to control the ratio between a transmission output shaft 136 and the transmission input shaft 132. The gearbox 124 may be automatically shifted from one ratio to another based on various vehicle and ambient operating conditions by an associated controller, such as a powertrain control unit (PCU) or vehicle system controller (VSC). Alternatively, gear selector 170 may be used in a manual mode (M) to request a desired gear with the ultimate gear selection controlled by PCU 150 based on current operating conditions. Power and torque from both the engine 114 and the M/G 118 may be delivered to gearbox 124. The gearbox 124 then provides powertrain output power and torque to output shaft 136.

It should be understood that the hydraulically controlled gearbox 124 used with a torque converter 122 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 124 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 136 is connected to a differential 140. The differential 140 drives a pair of wheels 142 via respective axles 144 connected to the differential 140. The differential transmits approximately equal torque to each wheel 142 while permitting slight speed differences such as when the vehicle turns a corner. Different types of differentials or similar devices may be used to distribute torque from the powertrain to one or more wheels. In some applications, torque distribution may vary depending on the particular operating mode or condition.

The powertrain 112 further includes an associated controller 150 such as a powertrain control unit (PCU). While illustrated as one controller, the controller 150 may be part of a larger control system and may be controlled by various other controllers throughout the vehicle 110, such as a vehicle system controller (VSC), for example. It should therefore be understood that the powertrain control unit 150 and one or more other controllers can collectively be referred to as a "controller" that controls various actuators in response to signals from various sensors to control functions such as starting/stopping engine 114, operating M/G 118 to provide wheel torque or charge battery 120, select or schedule transmission shifts, and determine or calculate and adapt or adjust a torque converter clutch capacity based on a stored model or table, for example. Controller 150 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 150 may communicate signals to and/or from engine 114, disconnect clutch 126, M/G 118, battery 120, torque converter clutch 134, transmission gearbox 124, and power electronics 156. Although not explicitly illustrated, those of ordinary skill in the art will recognize various functions or components that may be controlled by controller 150 within each of the subsystems identified above. Representative examples of parameters, systems, and/or components that may be directly or indirectly actuated using control logic and/or algorithms executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging or discharging (including determining the maximum charge and discharge power limits), regenerative braking, M/G operation, clutch pressures for disconnect clutch 126, torque converter clutch (or launch clutch) 134, and transmission gearbox 124, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), impeller speed, M/G input/output shaft speed, torque converter bypass clutch 134 status (TCC), deceleration or shift mode (MDE), battery temperature, voltage, current, or state of charge (SOC) for example.

Control logic, functions, or algorithms performed by controller 150 may be represented by flow charts or similar diagrams in one or more figures. These figures provide representative control strategies, logic, and/or algorithms that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 150. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 152 is used by the driver of the vehicle to provide a demanded torque, power, or drive command to propel the vehicle. In general, depressing and releasing the accelerator pedal 152 generates an accelerator pedal position signal that may be interpreted by the controller 150 as a demand for increased power or decreased power, respectively. Release of accelerator pedal 152 may be interpreted differently depending on the particular operating mode.

In various prior art implementations of a hybrid vehicle having a step-ratio transmission, driver requests are interpreted by a Vehicle System Control (VSC) as implemented by PCU 150 in the representative embodiment of FIG. 1. Driver requests may include gear selection (PRNDL) via selector 170 and accelerator pedal position sensor (APPS) 152 to interpret the driver intent with respect to wheel torque. The driver input from the brake pedal position sensor (BPPS) 158 is interpreted by a Brake System Control Module (BSCM, not specifically illustrated) and a wheel torque modification request is sent to the VSC to adjust the final wheel torque. A high voltage battery energy controller (BECM, not specifically illustrated) monitors various battery operating parameters such as battery temperature, voltage, current, and SOC and determines an associated allowable discharge power limit and allowable charge power limit. The VSC determines the powertrain operating point to maintain battery state of charge, minimize fuel consumption, and deliver the driver demanded vehicle operation. A Torque Control (TC) feature or module inside the VSC determines torque provided by the engine 114 and M/G 118.

Various embodiments according to the disclosure use position of accelerator pedal 152 as a demanded torque that may be delivered by either or both of the torque actuators, i.e. engine 114 and/or M/G 118, as determined by controller 150. When the accelerator pedal 152 is not applied, both the engine 114 and M/G 118 can be stopped such that the impeller of torque converter 122 is also stopped. Lightly applying the accelerator pedal 152 below an associated threshold position can be interpreted by controller 150 as a pull-up or start request for engine 114 and the system can start the engine 114 and lock the upstream or disconnect clutch 126. Various embodiments may also include an engine starter motor or integrated starter generator (ISG) (not shown) to provide engine starting.

One of the torque actuators can be operated in a speed control mode (typically the M/G 118) and the other actuator can be operated in a torque control mode (typically engine 114). The amount of charging torque used for charging battery 120 can be limited to a narrow range while the accelerator pedal 152 is lightly applied. The actual amount of battery charging may depend on the battery state of charge (SOC) and various other battery operating parameters. As the accelerator pedal position increases, the maximum charging torque can be increased while the accelerator pedal position or rate of change remains below an associated threshold. This provides the driver the ability to more quickly charge the traction battery 120. The actual charging rate may be determined by the battery energy management strategy.

As also shown in FIG. 1, a brake pedal 158 may be used by the driver to provide a demanded braking torque to slow the vehicle. In general, depressing and releasing the brake pedal 158 generates a brake pedal position signal that may be interpreted by the controller 150 as a demand to decrease the vehicle speed. Based upon inputs from the accelerator pedal 152 and brake pedal 158, the controller 150 commands the torque to the engine 114 and M/G 118, and controls friction brakes 160. The controller 150 also controls the timing of gear shifts within the gearbox 124, as well as engagement or disengagement of the disconnect clutch 126 and the torque converter bypass clutch 134. Like the disconnect clutch 126, the torque converter bypass clutch 134 can be modulated across a range between the engaged and disengaged positions as previously described. This produces a variable slip in the torque converter 122 to provide driveline isolation and improve drivability, in addition to the variable slip produced by the hydrodynamic coupling between the impeller and the turbine. Alternatively, the torque converter bypass clutch 134 may be operated as locked or open without using a modulated operating mode depending on the particular application.

When controller 150 operates torque converter clutch or launch clutch 134 in a variable slip mode, the torque converter clutch capacity is controlled by adjusting the pressure to the torque converter clutch. Controller 150 may include a torque converter clutch model that predicts the transfer function between pressure and torque capacity stored in memory as a look-up table, for example, and/or calculated based on various model parameters and variables. The model may be used to estimate the torque converter clutch capacity and may be adapted or adjusted dynamically based on measured or calculated impeller torque when the clutch begins to slip as described in greater detail below.

Various vehicle control functions may rely on an accurate estimation of the torque converter clutch capacity. In one application, a torque converter model is used to predict the required impeller speed needed to deliver the driver desired torque based on the current turbine speed and torque converter clutch capacity. This model allows the system to operate M/G 118 in a speed control mode in situations where coordinating the torque produced by engine 114 and M/G 118 is particularly difficult as described in greater detail in commonly owned and co-pending U.S. patent application Ser. No. 15/241,995 filed Aug. 19, 2016, the disclosure of which is hereby incorporated by reference in its entirety. The same type of torque converter model may can also be used to compensate for torque converter clutch state changes as described in greater detail in commonly owned and co-pending U.S. patent application Ser. No. 15/241,971 filed Aug. 19, 2016, the disclosure of which is hereby incorporated by reference in its entirety. Quickly opening the torque converter clutch may result in a torque hole. Compensating for the predicted change in impeller speed resulting from opening the torque converter clutch (inertial torque compensation) removes this torque hole. However, these control functions and similar vehicle control functions rely on an accurate estimation of the torque converter clutch capacity for best performance.

To drive the vehicle with the engine 114, the disconnect clutch 126 is at least partially engaged to transfer at least a portion of the engine torque through the disconnect clutch 126 to the M/G 118, and then from the M/G 118 through the torque converter 122 via the hydrodynamic coupling of the impeller and turbine and/or the torque converter clutch 134, and gearbox 124. The M/G 118 may assist the engine 114 by providing additional power to turn the shaft 130. This operation mode may be referred to as a "hybrid mode" or an "electric assist mode."

To drive the vehicle with the M/G 118 as the sole power source, the power flow remains the same except the disconnect clutch 126 isolates the engine 114 from the remainder of the powertrain 112. Combustion in the engine 114 may be disabled or otherwise OFF during this time to conserve fuel. The traction battery 120 transmits stored electrical energy through wiring 154 to power electronics 156 that may include an inverter, for example. The power electronics 156 convert DC voltage from the battery 120 into AC voltage to be used by the M/G 118. The controller 150 commands the power electronics 156 to convert voltage from the battery 120 to an AC voltage provided to the M/G 118 to provide positive or negative torque to the shaft 130. This operation mode may be referred to as an "electric only" or "EV" operation mode.

In any mode of operation, the M/G 118 may act as a motor and provide a driving force for the powertrain 112. Alternatively, the M/G 118 may act as a generator and convert kinetic energy from the powertrain 12 into electric energy to be stored in the battery 120. The M/G 118 may act as a generator while the engine 114 is providing propulsion power for the vehicle 110, for example. The M/G 118 may additionally act as a generator during times of regenerative braking in which torque and rotational (or motive) energy or power from wheels 142 is transferred back through the gearbox 124, torque converter 122, (and/or torque converter bypass clutch 134) and is converted into electrical energy for storage in the battery 120. The M/G 118 may be operated in a torque control mode to provide a target or requested output torque, or in a speed control mode to provide a target or requested output speed.

The battery 120 and the M/G 118 may also be configured to provide electrical power to one or more vehicle accessories 162. The vehicle accessories 162 may include, but are not limited to, air conditioning systems, power steering systems, electric heaters, or any other system or device that is electrically operated.

It should be understood that the schematic illustrated in FIG. 1 is merely representative and is not intended to be limiting. Other configurations are contemplated that utilize selective engagement of both an engine and a motor to transmit torque through the transmission. For example, the M/G 118 may be offset from the crankshaft 128, an additional motor may be provided to start the engine 114, and/or the M/G 118 may be provided between the torque converter 122 and the gearbox 124. Other configurations are contemplated without deviating from the scope of the present disclosure.

FIGS. 2A-2D illustrate operation of a system or method for adapting a torque converter clutch capacity model for use in controlling a hybrid vehicle according to one or more embodiments of the present disclosure. Adaptation or correction of the torque converter clutch capacity model may be performed during normal operation of the vehicle under appropriate operating conditions. To provide driveline damping and isolation, the torque converter clutch 134 may be operated in a slipping mode or fully open mode during an engine pull-up to start the engine 114. The torque converter clutch 134 is often fully locked prior to starting the engine to improve vehicle operating efficiency. In these situations, controller 150 controls the torque convert clutch apply pressure to reduce the torque converter clutch capacity below the driver torque demand resulting in slipping of the torque converter clutch 134.

Figure 2A:
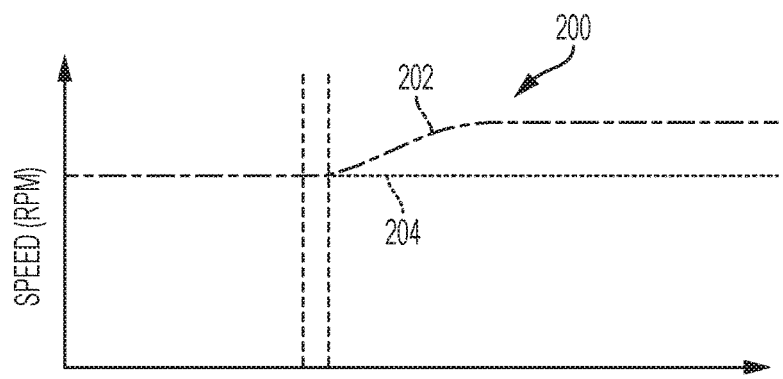
FIGS. 2A-2D are graphs illustrating representative operation of a controller applying a gain or offset to adjust a torque converter clutch capacity estimate according to one or more embodiments.
Figure 2B:
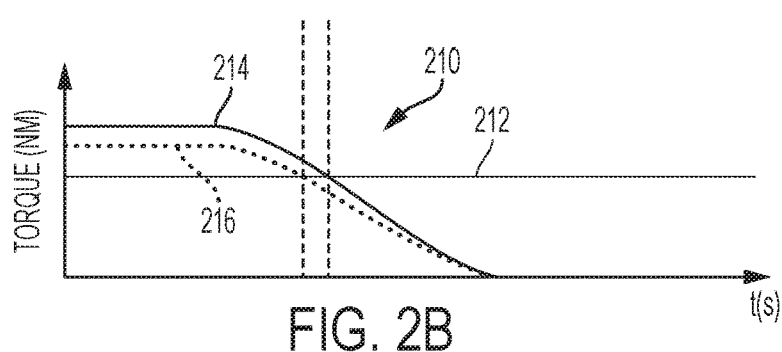
Figure 2C:
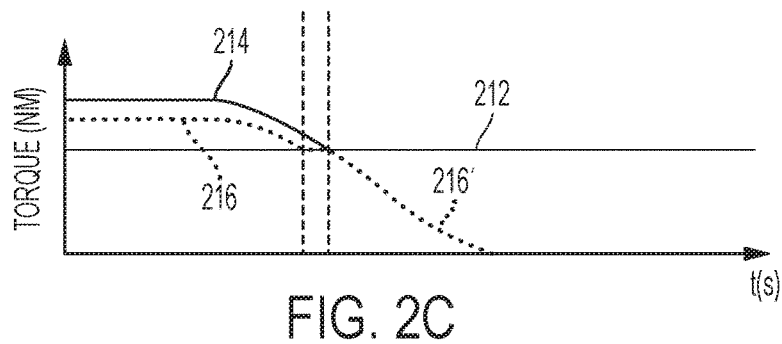
Figure 2D:
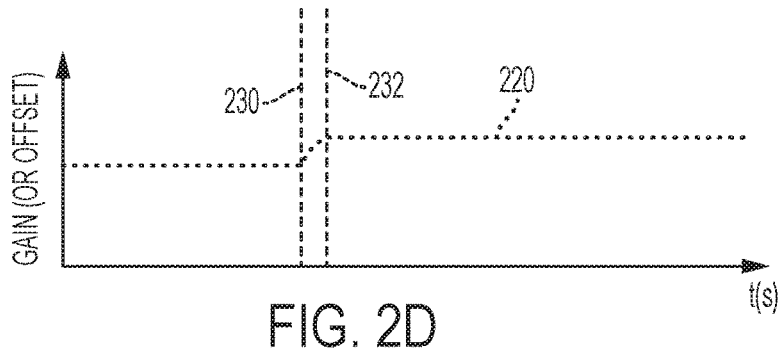

FIG. 2A illustrates a graph 200 with impeller speed 202 and turbine speed 204 during a torque converter clutch opening event where the clutch capacity model may be adapted or corrected according to embodiments of the present disclosure. FIG. 2B illustrates a graph 210 showing impeller torque 212, actual torque converter clutch capacity 214, and estimated torque converter clutch capacity 216 prior to adaptation or correction as a function of time. FIG. 2C illustrates impeller torque 212, actual torque converter clutch capacity 214, and estimated torque converter clutch capacity 216 prior to adaptation and estimated torque converter clutch capacity 216' after adaptation or correction as a function of time. FIG. 2D illustrates a torque converter clutch capacity gain or correction 220 as a function of time.

FIGS. 2A-2D illustrate the response of the system during a representative torque converter clutch opening event. In this representative example, the estimated or calculated torque converter clutch capacity 216 provided by the model stored as equation parameters or a look-up table in memory is lower than the actual capacity 214. Based on the estimated torque converter clutch capacity 216, the control system expects the torque converter clutch 134 to begin slipping at the point where the estimated torque converter clutch capacity 216 falls below the impeller torque 212 as generally indicated by the left or first vertical dashed line 230. However, as shown in FIG. 2A, the impeller speed 202 continues to match the turbine speed 204 indicating that the torque converter clutch has not started slipping yet. Because slip is not observed based on the measured impeller speed 202 and turbine speed 204, the torque converter correction gain or offset 220 (FIG. 2D) is increased. While the actual torque converter clutch capacity represented by line 214 is not actually yet known, the actual capacity must be larger than the current input torque because the clutch is still holding and has not started slipping. The adaptive correction gain 220 is increased until the torque converter clutch 134 actually begins to slip as indicted by a differential speed between the impeller speed 202 and the turbine speed 204 as represented by the second or right vertical dashed line 232. At this point, the torque converter clutch capacity is known to be equal to the impeller torque so that the gain, offset, or other correction is then stored for subsequent use by the torque converter clutch capacity model. As shown in FIG. 2C, the estimated torque converter clutch capacity after correction represented by line 216' is substantially identical to the actual torque converter clutch capacity as determined by the impeller torque 212 when the torque converter clutch starts to slip as indicated by the differential speed between the impeller and turbine exceeding an associated threshold as represented by line 232.

While the representative embodiment illustrated in FIGS. 2A-2D provides an adaptive gain 220 which is multiplied by the model estimate to adjust the model estimate, an offset may also be used. Similarly, while a positive, non-linear gain is illustrated in FIG. 2D, other gains and/or offsets may result depending on the particular algorithm used to adapt estimated torque converter clutch capacity from the model to equal the impeller torque when the clutch starts slipping. For example, the amount of gain or offset may be a constant amount applied to the estimate during each control loop, or may vary based on one or more operating parameters. Negative gains or offsets may also be applied if the estimated torque converter clutch capacity exceeds the actual capacity and the clutch begins slipping prior to the point represented by line 230.

Figure 3:
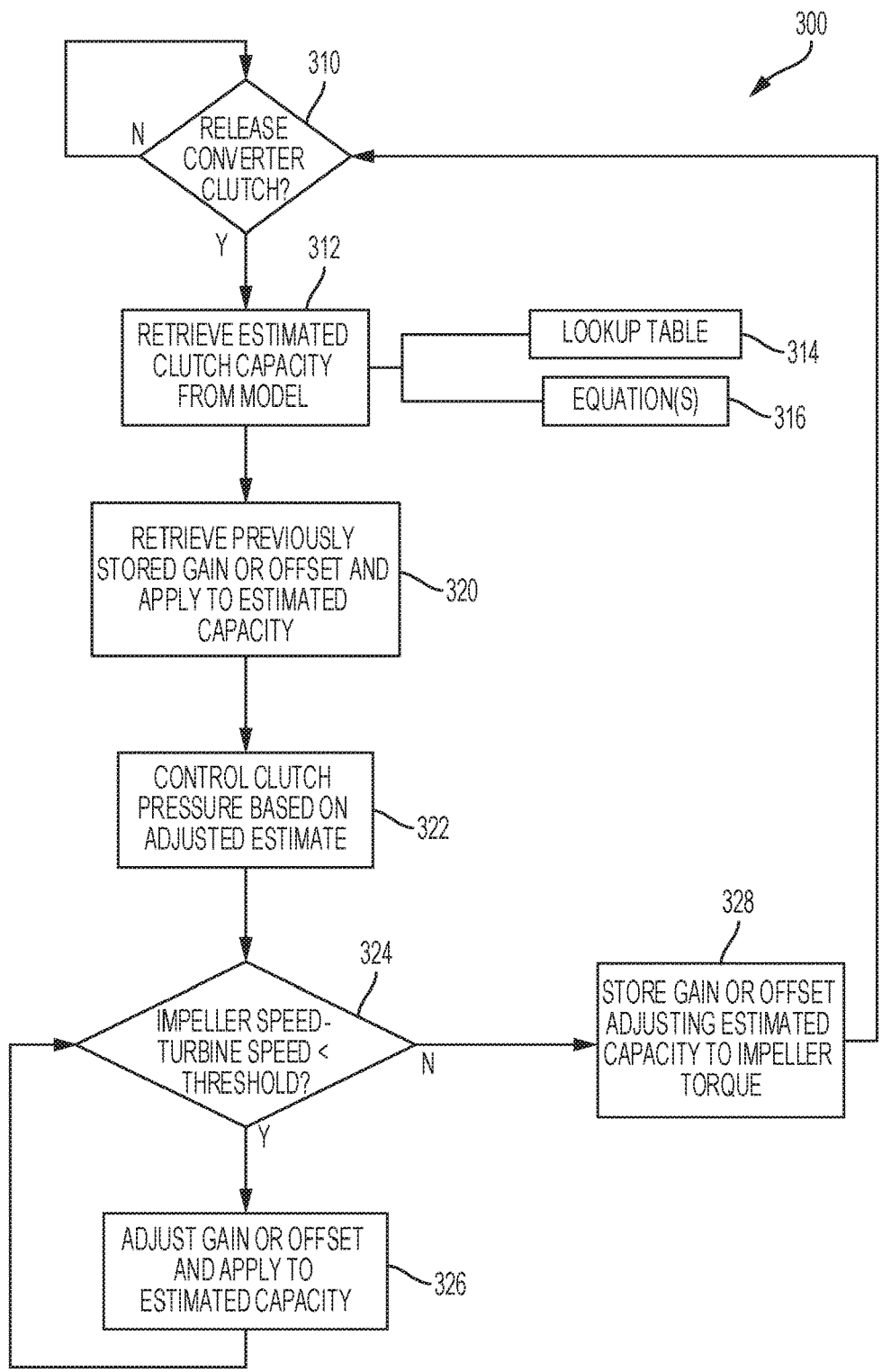
FIG. 3 is a flow chart illustrating operation of a system or method for controlling a hybrid vehicle having an automatic transmission using adaptive torque converter clutch capacity estimation according to one or more embodiments.

FIG. 3 is a flowchart illustrating operation of a representative system or method for controlling a hybrid vehicle based on adaptive torque converter clutch capacity estimation according to one or more embodiments of the disclosure. As previously described, a control algorithm as represented by flowchart 300 may be implemented by one or more controllers or processors, such as controller 150 (FIG. 1), for example. In the representative embodiment illustrated, the estimated torque converter clutch capacity is adapted or adjusted during a torque converter clutch release event that may be initiated by the controller in response to various vehicle operating conditions, such as an engine pull-up request when the torque converter clutch is locked. The estimated capacity may be adjusted each time the torque converter clutch is opened, or only when designated entry conditions suitable for adaptation are satisfied depending on the particular application and implementation.

The algorithm illustrated in FIG. 3 is initiated by a request or command to release or unlock the torque converter clutch as represented at 310. As previously described, the command to release or unlock the torque converter clutch may be used to initiate a controlled slip operation that facilitates transmission of some torque across the clutch, or a full release or opening of the clutch where torque transmission across the clutch is substantially zero. The estimated torque converter clutch capacity may be provided by a model stored in a non-transitory computer readable storage medium or memory with a current value for the estimated clutch capacity retrieved based on current operating conditions or parameters as represented at 312. The estimated clutch capacity model may be stored as a lookup table as represented at 314, or in one or more equations as represented at 316.

A previously stored clutch capacity gain, offset, or other adaptive parameter may be retrieved by the controller from memory and applied to the estimated clutch capacity obtained from the model as represented at 320. The adjusted estimate may then be used to control the clutch pressure to release the clutch for either a controlled slip event, or a full release/open event as represented at 322. The torque converter impeller speed and turbine speed are monitored by the controller to determine when the torque converter clutch begins to slip as represented at 324. In the representative embodiment illustrated, the logic of block 324 determines that the torque converter clutch is locked while the absolute value of the difference between the impeller speed and the turbine speed is less than an associated threshold, which may be zero or a small amount to account for measurement error, lag, fast transients, etc. As previously described and illustrated with respect to FIGS. 2A-2D, impeller speed will match turbine speed while the torque converter clutch is locked such that a speed differential between impeller and turbine speeds may be used to indicate that the clutch is slipping or open. Thus, the representative logic illustrated used to determine that the torque converter clutch is locked or holding may be reversed to indicated that the torque converter clutch has started slipping when the impeller and turbine speed differential is greater than a corresponding threshold, which may be zero or a small number as previously described. Stated differently, the state of the torque converter clutch may be determined based on a speed differential between the impeller speed and the turbine speed relative to a threshold as generally represented at 324.

As the controller reduces the clutch apply pressure based on the estimated clutch capacity, which may be adjusted by a previously stored gain or offset value, to release the clutch as represented at 312, 320, and 322, if the impeller speed and turbine speed indicate the clutch is still holding at 324 as represented by a result of "Y" then the gain or offset is modified and applied to the estimated capacity as indicated at 326 and generally illustrated in FIG. 2D. This is repeated until the difference between the impeller speed and the turbine speed is equal to or exceeds the threshold as represented by a result of "N" at 324, indicating that the clutch has started to slip. At this point, the actual clutch capacity is known and is equal to the impeller torque. The associated gain or offset value is stored in memory for subsequent retrieval as represented at 328.

The representative embodiment illustrated in FIG. 3 adapts the estimated torque converter clutch capacity during a clutch unlock or opening event as previously described. In other embodiments, the estimated torque converter clutch capacity is adjusted using an adaptive gain or offset in a similar fashion during a torque converter clutch lock or engagement event. For example, converter clutch apply pressure is controlled and increased based on the estimated torque converter clutch capacity, which may be adjusted by a previously stored gain or offset value. The gain or offset value may be modified while a differential speed between the impeller and turbine is above an associated threshold indicating that the clutch is slipping. When the clutch stops slipping, the actual clutch capacity is equal to the impeller torque and the associated gain or offset value is stored in memory for subsequent use by any other control algorithm that uses the estimated torque converter clutch capacity model.

Those of ordinary skill in the art will recognize one or more advantages associated with various embodiments as previously described. For example, adaptive correction of torque converter clutch estimation may improve drivability by providing improved control of clutch pressure during controlled slip operation. More accurate estimation of torque converter clutch capacity may also be used to place the motor into speed control during operating conditions where coordinating torque of the engine and motor is difficult. Similarly, more accurate estimation of torque converter clutch capacity may be used to provide inertial torque compensation to reduce or eliminate torque holes associated with opening of the torque converter clutch.

While representative embodiments are described above, it is not intended that these embodiments describe all possible forms of the claimed subject matter. The words used in the specification are words of description rather than limitation, and it is understood that various changes may be made without departing from the spirit and scope of the disclosure. Additionally, the features of various implementing embodiments may be combined to form further embodiments that are not explicitly described or illustrated. While various embodiments may have been described as providing advantages or being preferred over other embodiments or prior art implementations with respect to one or more desired characteristics, as one of ordinary skill in the art is aware, one or more features or characteristics may be compromised to achieve desired overall system attributes, which depend on the specific application and implementation. These attributes include, but are not limited to: cost, strength, durability, life cycle cost, marketability, appearance, packaging, size, serviceability, weight, manufacturability, ease of assembly, etc. Embodiments described as less desirable than other embodiments or prior art implementations with respect to one or more characteristics are not necessarily outside the scope of the disclosure and may be desirable for particular applications.

What is claimed is:

1. A vehicle comprising:
    an engine;
    an electric machine selectively coupled to the engine;
    a transmission having a torque converter impeller coupled to the electric machine and a torque converter clutch selectively coupling the impeller to a turbine; and
    a controller configured to control torque converter clutch pressure according to impeller torque responsive to:
        impeller speed exceeding turbine speed during torque converter clutch disengagement; and
        turbine speed matching impeller speed during torque converter clutch engagement.

2. The vehicle of claim 1 further comprising a non-transitory computer readable storage device configured for communication with the controller, the computer readable storage device having stored data representing a torque converter clutch capacity model, wherein the controller is further configured to control the torque converter clutch pressure according to the torque converter clutch capacity model.

3. The vehicle of claim 2 wherein the stored data comprises a look-up table.

4. The vehicle of claim 1 wherein the controller is further configured to:

retrieve an estimated torque converter clutch capacity from a non-transitory computer readable storage medium; and adjust the estimated torque converter clutch capacity by applying a gain to the estimated torque converter clutch capacity such that an adjusted torque converter clutch capacity matches the impeller torque responsive to the impeller speed exceeding turbine speed during the torque converter clutch disengagement.

5. The vehicle of claim 4 wherein the controller is further configured to store the gain that results in the estimated torque converter clutch capacity equaling the impeller torque in the non-transitory computer readable storage medium.

6. The vehicle of claim 5 wherein the controller is further configured to retrieve the gain from the non-transitory computer-readable storage medium and apply the previously stored gain to the estimated torque converter clutch capacity during subsequent retrieval of the estimated torque converter clutch capacity from the non-transitory computer readable storage medium.

7. The vehicle of claim 1 wherein the controller is further configured to control the torque converter clutch pressure according to an estimated torque converter clutch capacity, and adjust the estimated torque converter clutch capacity by applying an offset to the estimated clutch capacity based on the impeller torque.

8. The vehicle of claim 7 wherein the controller is further configured to store the offset that results in the estimated torque converter clutch capacity equaling the impeller torque in a non-transitory computer readable storage medium.

9. The vehicle of claim 8 wherein the controller is further configured to retrieve a previously stored offset from the non-transitory computer readable storage medium and apply the previously stored offset to a subsequently retrieved estimated torque converter clutch capacity.

10. The vehicle of claim 1 wherein the transmission comprises an automatic step-ratio transmission having a predetermined number of discrete selectable gear ratios.

11. The vehicle of claim 1 wherein the impeller torque corresponds to an output torque of the electric machine.

12. A hybrid vehicle having an electric machine coupled to an engine and a torque converter impeller of an automatic transmission having a bypass clutch configured to couple the impeller to a turbine, comprising:

a controller configured to control pressure of the bypass clutch according to an estimated clutch capacity adjusted to impeller torque responsive to a speed differential between an impeller speed and a turbine speed during opening of the bypass clutch.

13. The hybrid vehicle of claim 12 wherein the controller is configured to adjust the estimated clutch capacity by applying a gain to an estimated clutch capacity retrieved from a memory coupled to the controller based on a model of torque converter clutch capacity.

14. The hybrid vehicle of claim 13 wherein the model is stored as a lookup table in the non-transitory memory.

15. The hybrid vehicle of claim 12 wherein the controller is configured to adjust the estimated clutch capacity by applying an offset to an estimated clutch capacity retrieved from memory coupled to the controller.

16. The hybrid vehicle of claim 12 further comprising a memory readable by the controller and having stored data representing a torque converter clutch capacity model to provide the estimated clutch capacity.

17. A method for controlling a vehicle having an electric machine coupled to an engine and an automatic transmission including a torque converter impeller, turbine, and a clutch configured to couple the impeller to the turbine, comprising, by a controller:

controlling pressure of the torque converter clutch responsive to an estimated clutch capacity adjusted by a gain or offset to an impeller torque when impeller speed differs from turbine speed while releasing the torque converter clutch.

18. The method of claim 17 further comprising:

storing the gain or offset used to adjust the estimated clutch capacity to the impeller torque in a memory accessible by the controller, wherein the estimated clutch capacity is adjusted by a previously stored gain or offset retrieved from the memory.

19. The method of claim 17 further comprising retrieving the estimated clutch capacity from a torque converter clutch capacity model stored in a memory accessible by the controller.

20. The method of claim 19 wherein the torque converter clutch capacity model is stored in a lookup table in the memory.

* * * * *